US008674293B2

(12) United States Patent
Makarov et al.

(10) Patent No.: US 8,674,293 B2
(45) Date of Patent: Mar. 18, 2014

(54) MULTIREFLECTION TIME-OF-FLIGHT MASS SPECTROMETER

(71) Applicants: Alexander A. Makarov, Bremen (DE); Dmitry E. Grinfeld, Bremen (DE); Mikhail A. Monastyrskiy, Moscow (RU)

(72) Inventors: Alexander A. Makarov, Bremen (DE); Dmitry E. Grinfeld, Bremen (DE); Mikhail A. Monastyrskiy, Moscow (RU)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

(21) Appl. No.: 13/790,760

(22) Filed: Mar. 8, 2013

(65) Prior Publication Data

US 2013/0187043 A1 Jul. 25, 2013

Related U.S. Application Data

(63) Continuation of application No. 12/809,867, filed as application No. PCT/GB2008/004231 on Dec. 22, 2008, now Pat. No. 8,395,115.

(51) Int. Cl.

| | |
|---|---|
| *H01J 49/40* | (2006.01) |
| *H01J 49/26* | (2006.01) |
| *B01D 59/44* | (2006.01) |

(52) U.S. Cl.
USPC ........... 250/287; 250/282; 250/281; 250/283; 250/296 R; 250/423 R

(58) Field of Classification Search
USPC ........... 250/287, 282, 281, 283, 296 R, 423 R
See application file for complete search history.

(56) References Cited

U.S. PATENT DOCUMENTS

| | | | | |
|---|---|---|---|---|
| 6,674,069 | B1 * | 1/2004 | Martin et al. | 250/287 |
| 7,385,187 | B2 * | 6/2008 | Verentchikov et al. | 250/287 |
| 8,395,115 | B2 * | 3/2013 | Makarov et al. | 250/287 |
| 2007/0029473 | A1 | 2/2007 | Verentchikov | |

* cited by examiner

*Primary Examiner* — Nikita Wells
(74) *Attorney, Agent, or Firm* — Charles B. Katz

(57) ABSTRACT

A method of reflecting ions in a multireflection time of flight mass spectrometer is disclosed. The method includes guiding ions toward an ion mirror having multiple electrodes, and applying a voltage to the ion mirror electrodes to create an electric field that causes the mean trajectory of the ions to intersect a plane of symmetry of the ion mirror and to exit the ion mirror, wherein the ion are spatially focussed by the mirror to a first location and temporally focused to a second location different from the first location. Apparatus for carrying out the method is also disclosed.

19 Claims, 8 Drawing Sheets

| | |
|---|---|
| U1x | -528 |
| U2x | -7802 |
| U3x | 7733 |
| U4x | 162 |
| U5x | 3910 |

| | |
|---|---|
| U1y | -2482.0 |
| U2y | -6130.5 |
| U3y | -1511.5 |
| U4y | 716.5 |
| U5y | 1987.0 |
| U6y | 2605.0 |

MULTIREFLECTION TIME-OF-FLIGHT MASS SPECTROMETER

CROSS-REFERENCE TO RELATED APPLICATIONS

The present application is a continuation under 35 U.S.C. §120 and claims the priority benefit of co-pending U.S. patent application Ser. No. 12/809,867, filed Sep. 30, 2010, which is a National Stage application under 35 U.S.C. §371 of PCT Application No. PCT/GB2008/004231, filed Dec. 22, 2008. The disclosures of each of the foregoing applications are incorporated herein by reference.

FIELD OF THE INVENTION

This invention relates to a multireflection time-of-flight (TOF) mass spectrometer.

BACKGROUND OF THE INVENTION

Mass spectrometry is a well known analytical tool for identification and quantitative analysis of elements, compounds and so forth. The key qualities of a mass spectrometer are its resolving power, mass accuracy and sensitivity. One specific form of mass spectrometry, time-of-flight mass spectrometry (TOF-MS) involves accelerating ions in an electric field and then drifting them to a detector at a known distance. Ions of different mass to charge ratios (m/z) but having the same kinetic energy move at different velocities towards the detector and so separate according to their m/z.

The resolving power of TOF-MS is typically related to the flight length: the longer the distance between the location of ion packet formation and the detector, the greater the resolving power. To an extent, therefore, the resolution of a TOF-MS can be improved by maximizing the linear distance between the electric field and the detector. However, beyond a certain linear separation, practical problems arise as the instrument size increases, leading to increased cost, additional pumping requirements, and so forth.

To address this, so called multireflection time-of-flight mass spectrometry (MR TOF-MS) has been developed In a simplest embodiment of MR TOF-MS, two coaxial mirrors are provided (see, for example, U.S. Pat. No. 3,226,543, U.S. Pat. No. 6,013,913, U.S. Pat. No. 6,107,625 or WO-A-2002/103747). The problem with such an arrangement is that it severely limits the mass range that can be analyzed. This is because, as the ions of different m/z separate, the initial single pulse of ions becomes a train of pulses whose duration depends on the flight length they have travelled and the range of m/z ions within the train. On increasing separation this train of pulses separates to such an extent that ions at the front of the train reach around to the back of the train, and ion mixing begins which complicates m/z analysis of those ions. Consequently in such coaxial multireflection analysers, either the flight path length or the range of m/z must be limited for meaningful analysis to be possible or, alternatively, the overlapping information has to be deconvoluted by processing means. To achieve high resolving power, a long flight path length is required, and consequently the mass range of ions in the analyser mush be restricted.

Multireflection ion mirrors for TOF-MS that addressed this limited mass range are described in GB-A-2,080,021 to Wollnik. Here, each mirror provides a single reflection and is functionally independent of the other mirrors. Although the arrangement of Wollnik addresses the limited mass range of other prior art devices, it does not offer a practical solution which could implement the large number of ion mirrors in the case where a large ion incidence angle provides higher resolution.

SU-A-1,725,289 describes a TOF-MS with two opposed planar ion mirrors that allows for repeated reflections in a direction generally transverse to a drift direction (Y). Unlimited beam divergence in that drift (Y) direction limits the usefulness of this design with modern ion sources (electrospray, MALDI etc).

The problem of defocussing in a drift direction is addressed by Verentchikov et al in WO-A-2005/001878. Here, as in other prior art, the reflectors are extended in the shift direction. Because of the limited focussing in this plane, multiple planar lenses are inserted orthogonally to the drift direction (Y) so as repeatedly to refocus the ion beam as it spreads in that Y direction. Nonetheless, the amount of refocussing in that drift direction remains relatively weak (compared to the focusing in the other directions). Moreover, the presence of the planar lenses in the middle of the mirror assembly complicates the practical realization of the device, since, for example, it is then difficult to locate an ion detector and an ion source in the same plane (which is normally coincident with the plane of time of flight focussing of the mirrors). This in turn necessitates an additional isochronous ion transfer as shown in, for example, US-A-2006/0214100. It is also costly due to the inclusion of multiple additional components.

SUMMARY OF INVENTION

Against this background, there is provided a method of reflecting ions in a multireflection time of flight mass spectrometer comprising:

providing an ion mirror having a plurality of electrodes, the ion mirror having a cross section with a first, minor axis (Y) and a second, major axis (X) each perpendicular to a longitudinal axis (z) of the ion mirror which lies generally in the direction of time of flight separation of the ions in the mirror; guiding ions towards the ion mirror;

applying a voltage to the electrodes so as to create an electric field which:

(a) causes the mean trajectory of the ions to intersect a plane of symmetry of the ion mirror which contains the longitudinal (z) and major axes (X) of the mirror;

(b) causes the ions to reflect in the ion mirror; and (c) causes the ions to exit the ion mirror in a direction such that the mean trajectory of ions passing through the ion mirror has a component of movement in a direction (Y) perpendicular to the said plane of symmetry thereof.

Thus embodiments of the present invention, in its first aspect, provide for a MR TOF MS wherein ions move across a minor axis (Y) (such as, for example, a short side) of an ion mirror thereof as they undergo reflection within the ion mirror. This is in contrast to prior art arrangements such as, for example, the ion mirror arrangement of the above referenced Verentchikov publication, in which ions have a “shift direction” which is across a major axis of the ion mirror.

By generating a drift direction across the short or minor axis of the ion mirror, multiple ion mirrors can be stacked adjacent to one another with a relatively limited (shallow) angle of reflection within each mirror. Thus a large path length through a MR TOF MS can be created whilst adjacent mirrors can be shielded from one another by the presence of the mirror electrodes themselves. Furthermore, space charge effects are reduced.

Although, throughout the description, cartesian coordinate axes X, Y and Z are employed, it is to be understood that this is merely for ease of explanation and that the absolute orientation of the MR TOF MS is not important. Moreover, in defining the longitudinal axis to be generally in the direction of TOF separation it is recognized that the ions actually have a mean path through the ion mirror that is not parallel with the electrodes thereof at all times. Thus the longitudinal direction is simply intended to identify the cartesian direction which lies orthogonal to the sectional axes.

In a particularly preferred embodiment of this aspect of the present invention a voltage may be applied to the electrodes so as to create an electric field which causes ions to cross the plane of symmetry at least three times. In other words, ions described a "gamma" shape viewed in a plane containing the longitudinal and minor axes of the ion mirror.

The electric field of the ion mirror may be arranged to enhance spatial focussing by causing the ions to undergo spatial compression at least once (and preferably twice) during passage through the ion mirror.

In one particularly preferred embodiment, the ion mirror forms part of a stack of ion mirrors together constituting a first ion mirror arrangement. A second ion mirror arrangement is also provided, opposed to the first ion mirror arrangement. Ions are directed into the first ion mirror of the first mirror arrangement where they reflect back towards the second ion mirror arrangement, and are then reflected into a second ion mirror of the first ion mirror arrangement, back to the second ion mirror arrangement and so forth. Thus ions describe a series of "gamma" shaped loops within the first ion mirror arrangement, being reflected back each time by the second ion mirror arrangement. In this way, a "shift" direction in the direction of the minor axis of each ion mirror of the first ion mirror arrangement is established. Spatial focussing within each ion mirror of the first ion mirror arrangement obviates the need to have spatial focussing means elsewhere which is a significant drawback of the Verentchikov arrangement described above.

In one alternative, the second ion mirror arrangement likewise comprises a plurality of (for example, four) ion mirrors, each opposed to a corresponding ion mirror within the first ion mirror arrangement. In an alternative embodiment, however, the second ion mirror arrangement has a plane of symmetry containing a longitudinal axis generally perpendicular to a plane of reflection of the second ion mirror arrangement, and a minor axis of the cross section of the second ion mirror arrangement, and ions intersect that plane of symmetry of the second ion mirror arrangement as they reflect within it. This plane of symmetry of the second ion mirror arrangement is, preferably, perpendicular to the plane of symmetry defined by the longitudinal and minor axes of each ion mirror in the first ion mirror arrangement.

It has been discovered that, optimally, four ion mirrors are preferable within the first ion mirror arrangement. Four ion mirrors appears to optimise the degree of TOF focussing.

It is possible to arrange for ions having passed through the first and second ion mirror arrangements in zig-zag fashion to be detected upon their exit. Alternatively, ions may be passed to a further ion processing device such as a fragmentation chamber or the like. Furthermore, ions may be reflected back through the MR TOF MS and, most preferably, reflected once again in the forward direction to make a total of three passes through the MR TOF MS. Because of the difference in time of flight of ions of different mass to charge ratios, increasing the number of passes through the device beyond three leads to an undesirably small mass range of analysis, in a similar manner to that described in relation to the coaxial mirror arrangement of the prior art.

In accordance with a second aspect of the present invention, there is provided a method of reflecting ions in a multireflection time of flight mass spectrometer comprising:

providing a first ion mirror having a plurality of electrodes and defining a longitudinal axis generally orthogonal to a plane of reflection of ions within the first ion mirror;

providing a second ion mirror generally opposed to the first ion mirror, the second ion mirror having a plurality of electrodes and defining a longitudinal axis generally orthogonal to a plane of reflection of ions within the second ion mirror;

guiding ions towards the first ion mirror;

supplying a voltage to the electrodes of the first ion mirror so as to create an electric field which causes the ions entering the first ion mirror to be reflected back out of it;

directing ions reflected out of the first ion mirror into the second ion mirror;

supplying a voltage to the electrodes of the second ion mirror so as to create an electric field which causes the ions entering the second ion mirror to be reflected back out of it;

wherein the steps of guiding the ions towards the first ion mirror, creating an electronic field in the first ion mirror, and/or directing ions reflected out of the first ion mirror into the second ion mirror include controlling a mean ion trajectory so that ions intersect a plane of symmetry of the first ion mirror, in which the longitudinal axis thereof lies, at least three times before they are reflected by the second ion mirror.

In accordance with another aspect of the present invention, there is provided a method of reflecting ions in a multireflection time of flight mass spectrometer comprising:

providing a first ion mirror arrangement including at least one ion mirror which has a longitudinal axis generally perpendicular with a plane of reflection of ions within that at least one ion mirror; the or each ion mirror further having electrodes define a cross section with a first, minor axis and a second, major axis each orthogonal to the longitudinal axis of the, or the respective, ion mirror; providing a second ion mirror arrangement including at least one ion mirror which has a longitudinal axis generally perpendicular with a plane of reflection of ions within that at least one ion mirror; the or each ion mirror further having electrodes define a cross section with a first, minor axis and a second, major axis each orthogonal to the longitudinal axis of the, or the respective, ion mirror, wherein the or each ion mirror of the first ion mirror arrangement has a plane of symmetry which contains the longitudinal and major axes thereof, wherein the or each ion mirror of the second ion mirror arrangement likewise has a plane of symmetry which contains the longitudinal and major axes thereof, wherein the first and second ion mirror arrangements are arranged in opposition to each other so that ions may pass between them, and wherein the plane of symmetry of the or each ion mirror of the first ion mirror arrangement intersects the plane of symmetry of the or each ion mirror of the second ion mirror arrangement; the method comprising:

directing ions into a first ion mirror of the first ion mirror arrangement;

reflecting ions out of that first ion mirror of the first ion mirror arrangement;

directing ions into the second ion mirror arrangement; and reflecting ions out of that second ion mirror arrangement back towards the first ion mirror arrangement.

The invention also extends to a multireflection time of flight mass spectrometer (MR TOF MS) comprising:

a first ion mirror arrangement including at least one ion mirror which has a longitudinal axis generally perpendicular with a plane of reflection of ions within that at least one ion mirror; the or each ion mirror further having electrodes define a cross section with a first, minor axis and a second, major axis each orthogonal to the longitudinal axis of the, or the respective, ion mirror;

a second ion mirror arrangement including at least one ion mirror which has a longitudinal axis generally perpendicular with a plane of reflection of ions within that at least one ion mirror; the or each ion mirror further having electrodes define a cross section with a first, minor axis and a second, major axis each orthogonal to the longitudinal axis of the, or the respective, ion mirror;

means for supplying a voltage to the electrodes of the first and second ion mirror arrangements so as to establish electric fields therein; and an ion guiding means for introducing ions from an ion acceleration region into the MR TOF MS so as to cause ions so introduced to reflect between the first and second ion mirror arrangements at least once prior to exiting them for subsequent processing or detection.

In accordance with another aspect of the present invention there is provided a multi-reflection time of flight arrangement, having a first Z-axis which lies generally in the direction of time of flight, the arrangement comprising:

a first set of at least one mirrors providing focussing in a Y-direction;

a second set of at least one mirrors providing focussing in a X-direction; and at least one time focal point;

wherein Z, Y and X span a 3-dimensional space.

In accordance with yet another aspect of the present invention, there is provided a multi-reflection time of flight mass analyzer comprising:

a multiply folded flight path defining a longitudinal direction;

a first set of elongated electrodes arranged along a first transversal axis, said first set of elongated electrodes arranged to provide folding of the flight path and focusing in the direction of a second transversal axis; and a second set of elongated electrodes arranged along a third transversal axis, said second set of elongated electrodes arranged to provide folding of the flight path and providing focusing along a fourth transversal axis;

wherein the first and the third axis are inclined to one another and the second and the fourth axis are inclined to one another.

Further preferred embodiments and advantages will be apparent from the description which follows, and the claims.

BRIEF DESCRIPTION OF THE DRAWINGS

The present invention may be put into practice in a number of ways and some embodiments will now be described by way of example only and with reference to the accompanying figures in which.

DETAILED DESCRIPTION OF PREFERRED EMBODIMENTS

Figure 1A:
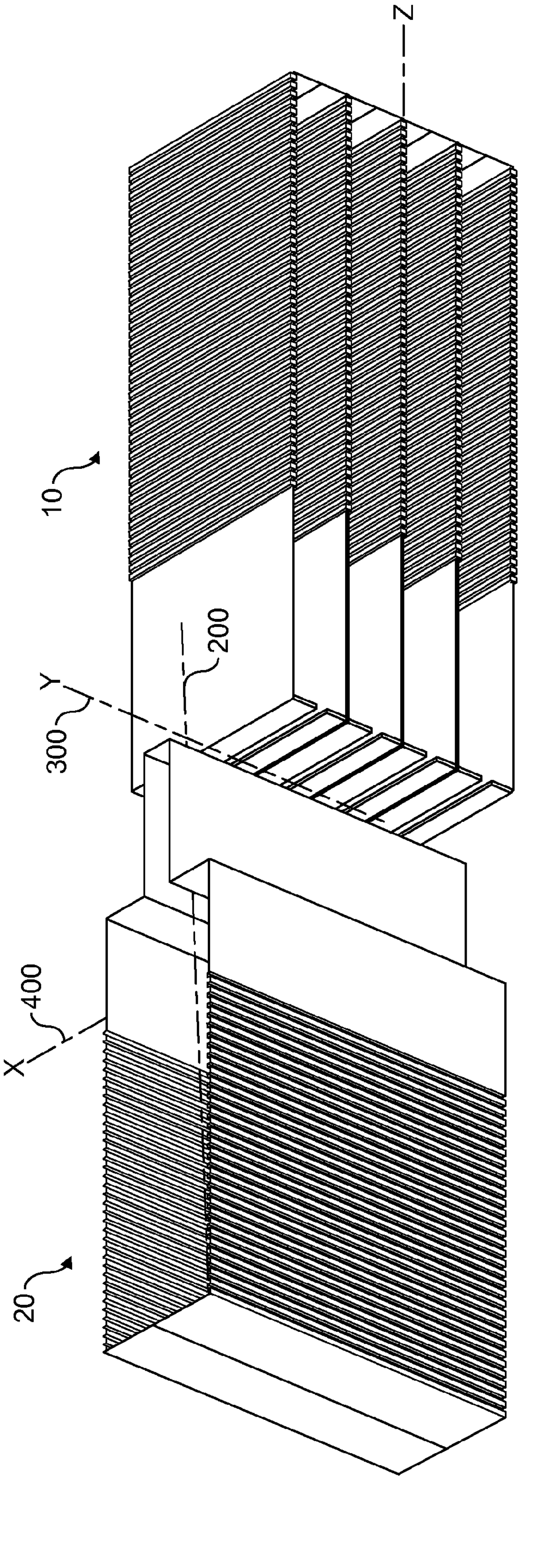
FIG. 1A shows a third angle elevation of a preferred embodiment of a multireflection time of flight mass spectrometer, with Type 1 and Type 2 opposed ion mirror arrangements.

FIG. 1A shows a third angle projection (perspective) view of a multireflection time of flight mass spectrometer (MR TOF MS). The MR TOF MS includes two separate ion mirror arrangements. The first ion mirror arrangement 10 forms one of a pair of systems of planar mirrors which are designated "Type 1" in the following description. The MR TOF MS of FIG. 1 also includes a second ion mirror arrangement 20 which is generally orthogonal with the first ion mirror 10 and designated "Type 2" in the following description.

Figure 1B:
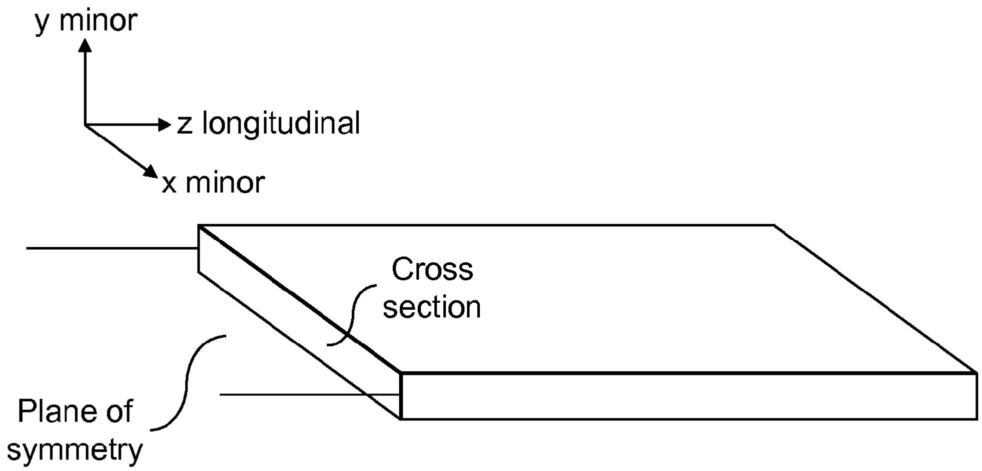
FIG. 1B shows a third angle elevation of one of the ion mirrors of the Type 1 ion mirror arrangement shown in FIG. 1.
Figure 5:
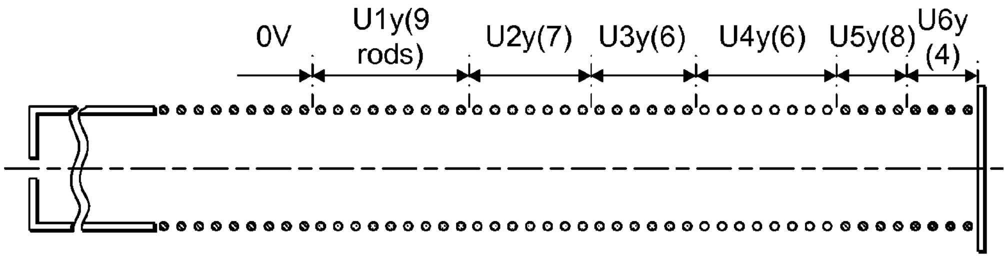
FIG. 5 shows, again in section in the YZ plane of FIG. 1, one possible arrangement of electrodes within a ion mirror of the Type 1 ion mirror arrangement in FIG. 1, along with some suitable voltages.

It will be noted that the first ion mirror arrangement 10 comprises, in the preferred embodiment of FIG. 1A, four ion mirrors stacked on top of each other in a direction parallel with the Y axis 300 as shown in FIG. 1A. FIG. 1B shows a single mirror of the first ion mirror arrangement. Each ion mirror comprises a set of electrodes (a preferred embodiment of which is shown in FIG. 5 below) which, when energized, create an electric field within each ion mirror. It will also be noted that the electrodes extend only part way along the longitudinal axis (in the Z direction 200 of FIG. 1) of each ion mirror so that there is a field free region between the second ion mirror arrangement 20 and the electrodes of the ion mirrors of the first ion mirror arrangement 10.

While the mirrors appear from FIG. 1 to be closed at the ends this is not a requirement of the embodiment of the invention.

Furthermore, while the Figure shows the Type 2 mirror to be rotated by 90° with respect to the Type 1 mirror, this is also not a requirement of the invention. Other degrees of rotation are contemplated in this invention.

The intention is to provide inclined and preferably orthogonal mirror arrangements which cooperate in the generation of separated temporal and spatial foci. The simplest embodiment of the apparatus of the invention has orthogonal mirror arrangements.

Each ion mirror of the first ion mirror arrangement has two planes of symmetry, a first containing the X and Z axes 400, 200, and a second containing the Y and Z axes. It is the first plane of symmetry, in the XZ direction, that is of most relevance for the ion mirrors in the first ion mirror arrangement 10, as will be explained in further detail in connection with FIGS. 2 and 3 in particular.

Finally with regard to FIG. 1 it will be noted that the second ion mirror arrangement 20 comprises a single ion mirror which likewise has two planes of symmetry (in the XZ and YZ planes) but, here, it is the plane of symmetry in the YZ plane that is of most interest.

Figure 2:
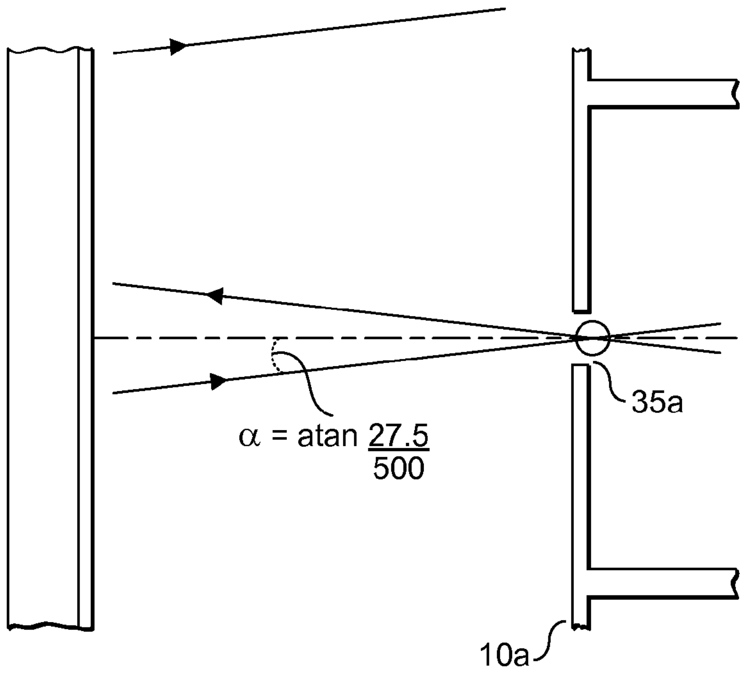
FIG. 2 shows a part of the arrangement of FIG. 1, in the plane YZ thereof.
Figure 3:
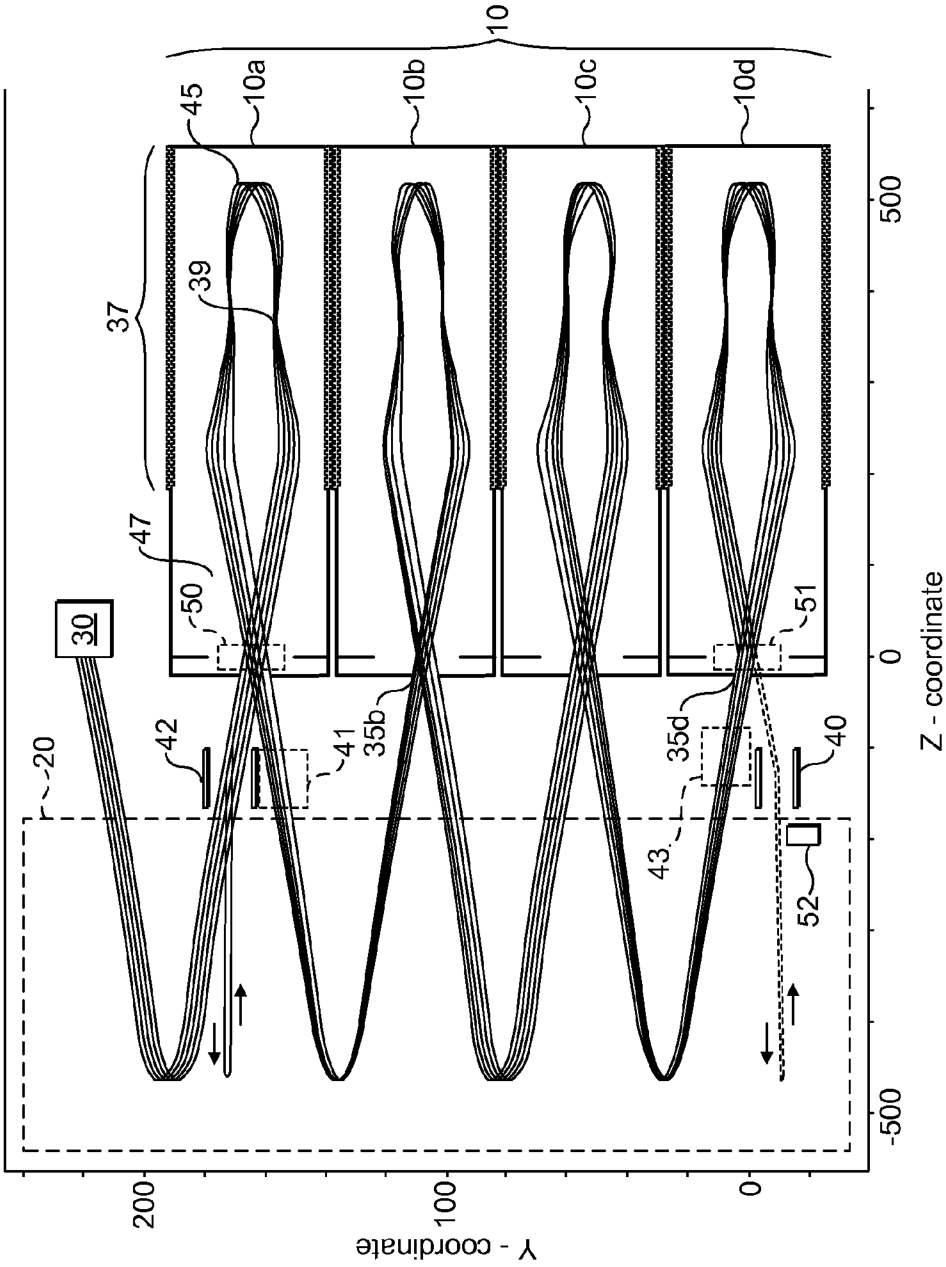
FIG. 3 shows a section through the MR TOF MS of FIG. 1 in the plane YZ thereof, along with exemplary ion trajectories in that plane.

Referring now to FIGS. 2 and 3, the mean trajectory of ions through the MR TOF MS will now be described. Ions are generated by an ion source 30 which is outside of the MR TOF MS. Following optional preprocessing in one or more stages of mass spectrometry, and/or ion cooling, for example, and storage in, for example, a linear trap, ions are ejected towards the MR TOF MS. In known manner, ions are accelerated through an electric field of known magnitude and are then allowed to drift without further acceleration towards the MR TOF MS. These ions are then directed towards the ion mirror arrangements 10, 20 and, after a first reflection in the second ion mirror arrangement 20, arrive at a slot 35*a* of a mirror 10*a*, seen best in FIG. 2, and which is formed in a front face of a first, upper (in the Y direction) ion mirror of the ion mirror arrangement 10. It will be seen that ions arrive at the aperture 35*a* at an angle α to the plane of symmetry as identified above (that is, the plane of symmetry in the XZ plane). Thus, the ion trajectory passes through that plane of symmetry for a first time at or around the entrance slot of 35*a* the first ion mirror 10*a*.

Ions continue generally in the direction that they enter the first ion mirror 10*a* since the first part of the ion mirror 10*a* in the longitudinal direction is a field free region without electrodes 47. Approximately one third of the way into the ion mirror (that is, approximately one third of the distance between the entrance slot 35*a* and the plane at which reflection occurs further along the longitudinal axis), ions enter an electric field established by a plurality of electrodes 37.

The electric field has the effect of spatially focussing the ion for a first time at a saddle point 38. The ions then continue in a direction generally parallel with the longitudinal axis of the ion mirror 10*a* before being reflected back at a turning point 45 defining a plane of reflection. It is at this point 45, where the ions change direction, that they intersect the plane of symmetry in the XZ plane for a second time.

The ions are then spatially focussed for a second time at a second saddle point 39 and then carry on again in a direction generally parallel with the longitudinal axis of the ion mirror 10*a*, before exiting the electric field of the ion mirror 10*a* into the field free region 47. The ions are deflected before leaving the electric field of the ion mirror 10*a* so that they once more have a component of movement in the Y direction. Thus they intersect the plane of symmetry in the XZ plane of the ion mirror 10*a* for a third and final time, again generally in the region of the elongate slot 35*a* as they pass back out of the ion mirror 10*a*.

Thus the shape described by the ions may be likened, generally, to the Greek "gamma" and ions intersect the plane of symmetry three times.

As an advantage and important effect the flight path is arranged such that a projection of the flight path onto the plane containing the longitudinal direction (Z) and the minor (Y) direction crosses over itself once for each entry into one of the first mirrors 10.

Having passed back through the elongate aperture 35*a*, ions continue moving right to left in FIG. 3 and enter the orthogonal second ion mirror arrangement (Type 2). The ions remain generally in the plane of symmetry (YZ) of the second ion mirror arrangement 20 but intersect the longitudinal (Z) axis thereof at an acute angle which may or may not be the angle α at which ions entering the first ion mirror arrangement 10 intersect the plane of symmetry of that mirror.

Following the second reflection in the second ion mirror arrangement 20, ions travel generally in a straight line back towards the first ion mirror arrangement 10 where they enter an elongate slot 35*b* of a second ion mirror 10*b* of the first ion mirror arrangement 10 which is adjacent the first ion mirror 10*a* of it, but whose longitudinal axis is displaced in the Y direction. The second ion mirror 10*b* is preferably of a identical construction to the first ion mirror 10*a* and thus has a set of electrodes extending part way along the longitudinal axis to provide an electric field for reflection of ions entering the second ion mirror 10*b*.

Ions again describe the "gamma" shape through the second ion mirror 10*b* so that they intersect the plane of symmetry of the second ion mirror 10*b* three times and so that ions leaving the second ion mirror 10*b* do so in a direction that has a component in the Y direction again.

Ions then pass back into the second ion mirror arrangement 20 where they are reflected at an angle to the longitudinal axis and thus continue with a component in the Y direction downwards (when viewed in the orientation of FIGS. 1, 2 and 3). Ions then enter a third ion mirror 10*c* of the first ion mirror arrangement 10, execute the loop "gamma" trajectory in it and are directed back again into the second ion mirror arrangement 20 for a further time. Here they are reflected again, still with a component of drift in the Y direction downwards, into a fourth and final ion mirror 10*d* of the first ion mirror arrangement 10. After completing a final traverse through the fourth ion mirror 10*d*, ions exit the elongate slot 35*d* of the fourth ion mirror 10*d* after which they arrive at detector 52, for detection. Only after the fourth ion mirror 10*d* of the first ion mirror arrangement 10*a* do aberrations of 1st, 2nd and 3rd order achieve a minimum and thus provide an optimized quality of time of flight focussing.

The second mirror arrangement 20 reduces spatial dispersion of ions in a second direction orthogonal or at least at an angle to the focusing direction of the mirror arrangement 10. Preferably the second mirror arrangement 20 provides focusing in that second direction.

Figure 9:
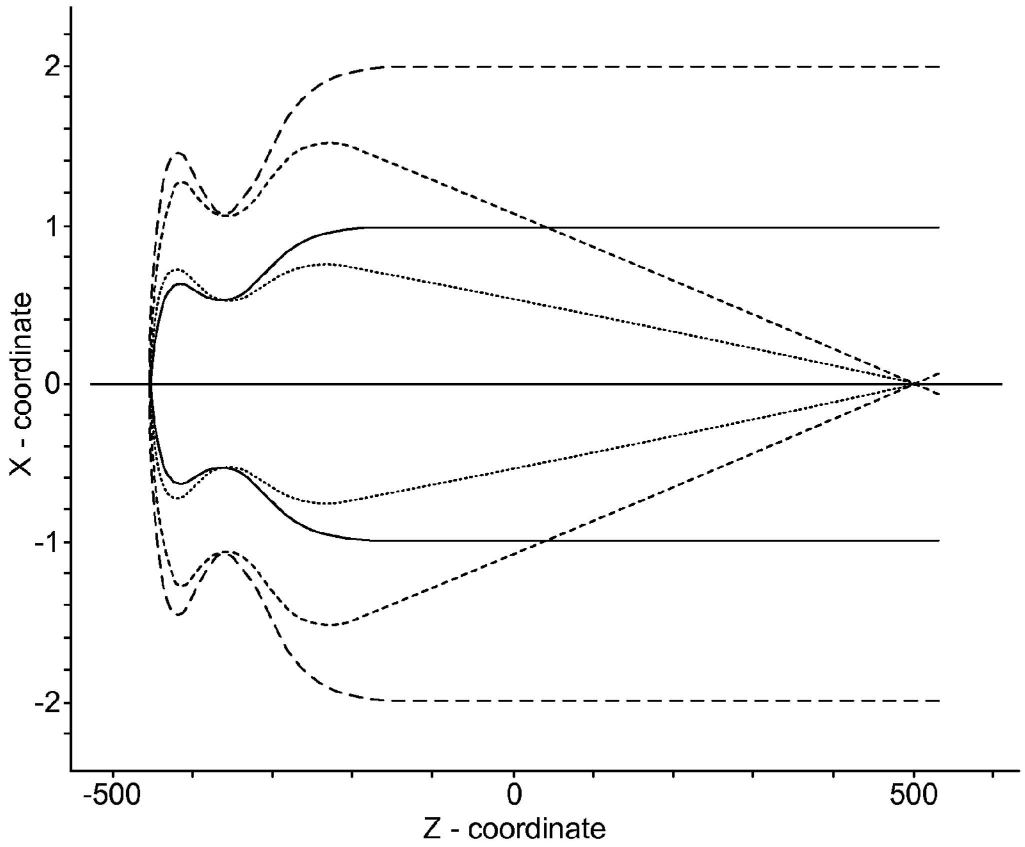
FIG. 9 shows, in section in the XZ plane, ion trajectories focussed on a time-focal point.

FIG. 9 shows a preferred configuration where the focal length of the second mirror assembly equals the Z-elongation of the ion flight path. That is an incident parallel beam is focused to a focal point at the turning point and vice versa. This configuration requires an even number of reflections to go from parallel to parallel beam or from focused to focused, so it is best suited for multi-reflection configurations. In exchange it carries the advantage of a maximised focal length, reducing errors.

It is to be understood that the preferred configuration has the first mirror assembly orthogonal to the second in the sense that the respective other mirror assembly does not affect the behaviour of the former in its main focusing direction.

It is not necessary that the Type 1 and Type 2 mirrors are orthogonal.

Thus the arrangement of FIGS. 1, 2 and 3 significantly increases the total path length between the acceleration region upstream of the MR TOF MS and the detector. However, the flight path may be increased further (effectively doubled) by reversing the direction of ion travel in the ion mirror arrangements 10, 20 as shown in FIG. 3 by the lower dashed line opposite the fourth ion mirror 10*d* of the first ion mirror arrangement 10. Instead of proceeding to detector 52, a second deflector 40 may be used to straighten the trajectories on their entrance into the second ion mirror arrangement 20 as they exit the fourth ion mirror 10*d* of the first ion mirror arrangement 10, and then return ions exactly on the incoming trajectory. On the way back, ions may be deflected in the X direction by third deflector 41, and captured by a second detector 50 located above the plane of the drawing in the X direction. The third deflector 41 could be energized only after all the ions of interest have passed through the MR TOF MS on the forward pass, and this of course limits the mass range, since heavy ions are just passing the third deflector 41 when relatively lighter ions are already coming back. However, this becomes a problem only for ions with ratios of time of flights of about 8:1, that is, for ratios of M/Z:$(M/Z)_{max}/(M/Z)_{min}>60$. This limitation is of limited practical concern as RF transmission devices normally used in the ion source 30 impose much more stringent limitations on the mass range.

The flight path may be increased still further by employing a fourth deflector 42 instead of the third deflector 41. The fourth deflector straightens up the path of the ions but keeps them generally in the YZ plane (in contrast to third deflector 41 which deflects ions up out of the YZ plane for detection at second detector 50)—see the upper part of FIG. 3. Ions whose trajectories have been straightened relative to the longitudinal axis of the second ion mirror arrangement 20 are reflected within so as to return back along a path generally parallel with the direction in which they enter the field of the second ion mirror arrangement 20, following which they are deflected back into the first ion mirror arrangement 10 at an angle to the longitudinal axis of the first ion mirror 10*a* so as to traverse a path through the two ion mirror arrangements 10, similar to the path traversed during the first pass there through. Since ions, in this embodiment, pass through the MR TOF MS three times, twice in the forward direction and once the "reverse" direction, they arrive at the elongate slot 35*d* of the fourth ion mirror 10*d* of the first ion mirror arrangement 10 and first deflector 43 is then activated to deflect the ions up out of the plane of the paper of FIG. 3 (in the X direction) towards the first detector 51. Preferably, the first deflector 43 is switched on once heavy m/z have passed it on their way back from deflection by the second deflector 40. Then ions are taken away from their second forward pass onto the first detector 51, with light m/z first followed by heavier m/z. In this case, the ratios of times of flight are about 2.4:1. This results in a much more modest $(m/z)_{max}/(m/z)_{min}\approx 6$. Any further increase in the flight path (for example, by passing the ions through two ion mirror arrangements 10, 20 a fourth time) further reduces the mass range of analysis though improves resolving power. Steeper deviation from the ion path, for example by locating the deflectors just before the detectors, or indeed integrating the deflectors with the detectors can improve this ratio by around 10-20%.

Instead of the first and/or second detectors 50, 51, as the case may be, ions may instead be removed from the plane of transmission through the MR TOF MS in the X direction to another stage of mass analysis (not shown in the Figures). For example, a fragmentation device may be situated out of the plane of FIG. 3 (in the X direction) so that, following fragmentation, ions can be reinjected into the same MR TOF MS or into another mass analyser.

A mass spectrometer incorporating the invention can comprise a first mass selector, which can be a multipole, an ion trap, or a time of flight instrument, including an embodiment of the invention, or an ion mobility device and any known collision, fragmentation or reaction device and a further mass analyzer which can preferably be an embodiment of the invention or—especially when the first mass analyzer is an embodiment of the invention—another mass analyzer, like a reflectron TOF or an ion trapping mass analyzer, e.g. an RF-ion trap, or an electrostatic trap or any type of FT/MS. Both mass analyzers can have separate detection means. Alternatively a low cost version could have detection means only after the second mass analyzer.

When the analyzer is not to be used re-entrant, as described above, also a combination of two embodiments of the invention can be advantageous.

Operation modes include full $MS^1$, as well as $MS^2$ or $MS^n$ in the known fashions, as well as the wide and narrow mass range detection modes disclosed in this description.

Advantageously an apparatus of the invention incorporates a chromatograph and an atmospheric pressure ion source or a laser desorption ion source.

Although the ion mirrors 10*a*-10*d* of the first ion mirror arrangement 10 as shown in FIGS. 1, 2 and 3 are planar, there is no requirement that they should be so formed. In particular, elliptic or circular cross section ion mirrors could equally be employed. Though not essential, it is preferable that the cross section of each ion mirror has a major and minor axis (that is, the sections are, for example, rectangular or elliptical), with the "gamma" shaped ion trajectories in each ion mirror causing a drift direction of the ions to be established in the Y direction, which is the direction of the minor rather than the major axis.

Preferably the major axes of the first set of mirrors (Type 1) and the second set of mirrors (Type 2) are different to each other.

As shown in the figures, the mirrors preferably comprise elongated electrodes or electrode elements in the shape of rods or plates which are arranged along the respective major axis of the mirror. The mirrors can be closed at the minor sides with similar electrode arrangements to eliminate fringing fields. These closing elements could also be PCBs which mimic the ideal field as found in the centre of the arrangements. However the mirrors can be open at the minor sides if those sides are sufficiently far from the path of the ion beam.

For non planar ion mirrors, electrodes may be formed by stamping or electrochemical etching. A preferred implementation employs flat plates on its edges to minimise fringing fields, so as to constitute a planar mirror. The flat plates are located, in preference, at least one mirror height away from the ion trajectories, and preferably more than 1.5 to 2 mirror heights.

Figure 6:
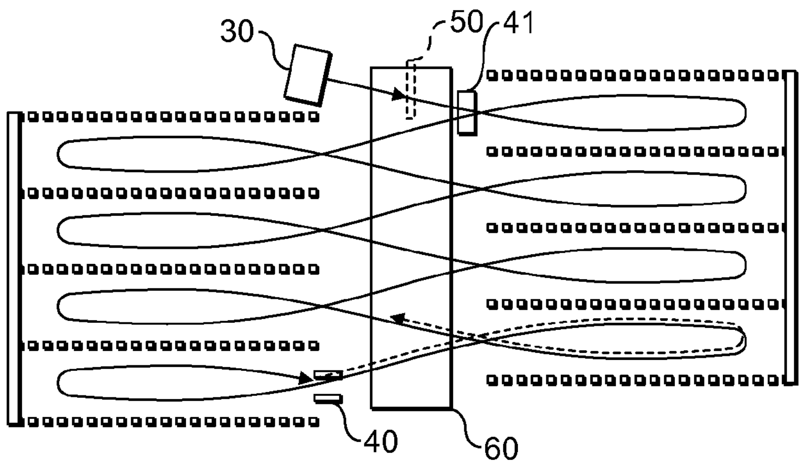
FIG. 6 shows, again in section in the YZ plane, an alternative arrangement of ion mirrors embodying the present invention.

The second ion mirror arrangement 20 may likewise be a single planar mirror (as shown in FIG. 1) or it may be a single elliptical mirror. To increase the flight length even further, additional layers of Type 2 mirrors may be employed above or below the single second ion mirror arrangement 20 of FIG. 1 (that is, in the +Y and/or −Y directions). Ions may be transferred from layer to layer using a pair of opposing deflector plates that allow ions to enter each Type 2 mirror arrangement always along the plane of symmetry. Furthermore, instead of a single ion mirror in each Type 2 mirror arrangement, multiple mirrors could instead be employed, which may be planar or non planar (e.g. elliptic or circular in cross section). Such an arrangement is shown in FIG. 6, where all mirrors in the first and second ion mirror arrangements are Type 1, with a single planar lens 60 formed between them. The planar lens 60 acts to focus ions in the "X" direction, that is, into the plane of paper of FIG. 6, since without the crossed planes of symmetry of earlier embodiments (FIG. 1, for example), there is no other source of ion focussing in that direction.

Though focussing of this planar lens 60 is unlikely to be as strong as the arrangement of FIGS. 1 to 3, the construction of FIG. 6 does have an advantage of higher tolerance to space charge, because ion packets will be shielded from ions of other m/z moving in neighbouring mirrors, at their turning points where the influence of space charge is expected to be most significant. This shielding occurs whilst the ions are within the Type 1 mirrors and so in the embodiment of FIG. 6, the ions are shielded at all of their turning points. The arrangement of FIG. 6 may also be more straightforward to manufacture since the single “Type 2” electrode of FIG. 1 can become difficult to maintain within suitable tolerances for longer path lengths.

As with the arrangement of FIG. 3, the forward pass through the MR TOF MS of FIG. 6 could be reversed by using deflectors 40 and 41 to double the flight length as shown by the dashed lines—detector 50 is once again located above or below the plane of the drawing of FIG. 6. Still a further increase in the flight length may be achieved by passing ions back through the arrangement of FIG. 6 for a third time (in the “forward” direction once more) as has been described previously in connection with FIG. 3. Furthermore, multiple layers of the lens 60 could be employed.

Figure 7:
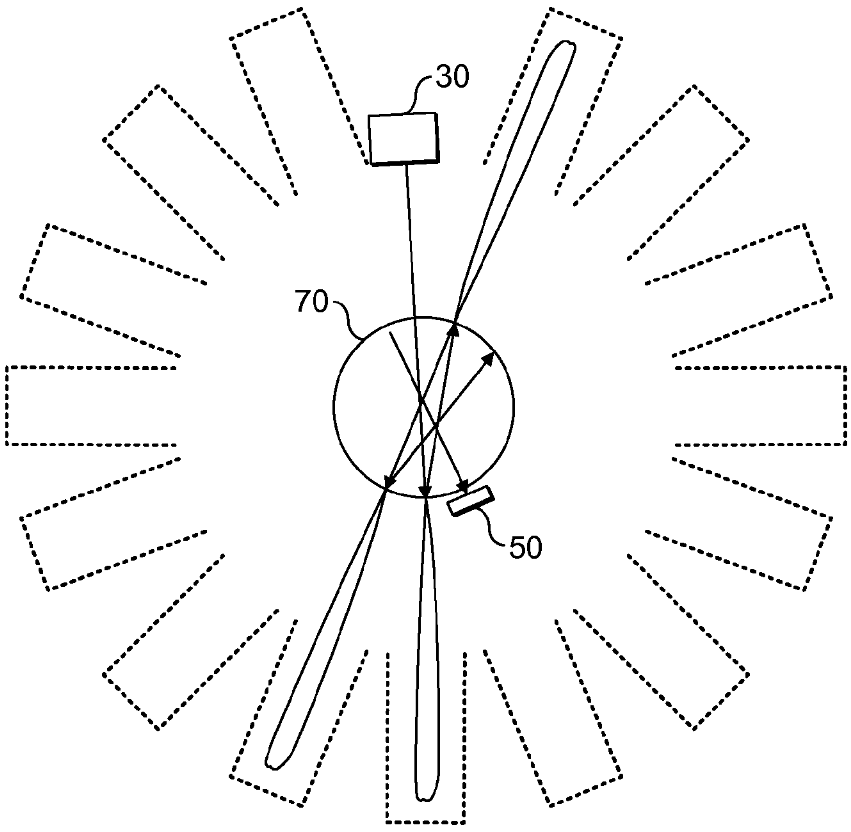
FIG. 7 shows, again in section in the YZ plane, a third embodiment of the present invention.

FIG. 7 shows still a further embodiment which extends the principles of FIG. 6 further. Instead of arranging the first and second ion mirror arrangements so that they are linearly opposed, as shown in FIGS. 3 and 6, the ion mirrors may instead be oriented towards a common centre with a circular lens 70 in the middle, so that ions move around a generally circular arrangement of ion mirrors.

Although the arrangements of FIGS. 6 and 7 show planar mirrors, as previously, the mirrors may instead be elliptical in cross section, or of other geometric shape. This may be advantageous since an elliptical cross section mirror, for example, may provide spatial focussing also perpendicular to the plane of trajectory. Of course, it is necessary to organise that orthogonal focussing so that aberrations are not significantly increased. By employing elliptical cross section mirrors, it may be that the lens 60/70 of FIGS. 6 and 7 may not be necessary.

Alternatively, as in the embodiment of FIG. 3, the space focusing in the transversal plane of FIGS. 6 and especially 7 can be arranged by using two types or orientations of mirrors, each providing focusing in a different transversal direction, and both cooperating in creation of the desired longitudinal (time) focal points.

Figure 8:
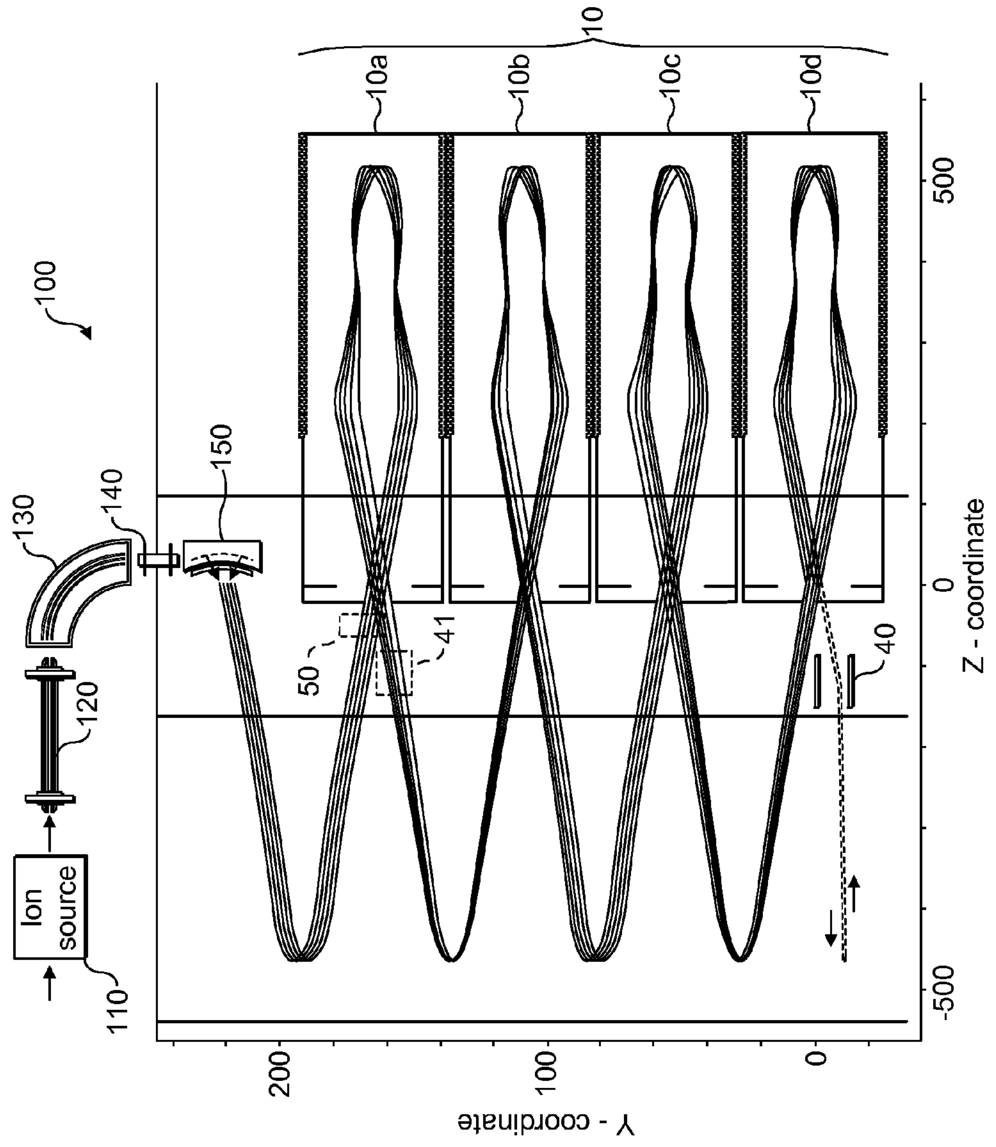
FIG. 8 shows a mass spectrometer system comprising an ion source, a linear trap and the MR TOF MS of FIG. 3.

FIG. 8 shows a mass spectrometer system 100, which includes an MR TOF MS as described above. The specific embodiment of MR TOF MS shown in FIG. 8 is that of FIG. 3 though the FIG. 6 or FIG. 7 embodiments could of course equally be employed.

Only those parts of the system 100 that are relevant to an understanding of the invention are shown in FIG. 8. The system includes an ion source 110 such as an electrospray or MALDI source. This generates a quasicontinuous stream of ions that are guided via lens 120 into a collision cell 130. Here, ions are (optionally) fragmented and then guided via second lens 140 into a linear trap 150. The linear trap 150 may take various forms such as a linear quadrupole, hexapole or octapole trap with straight elongate rods, or it may be curved (that is, has curved elongate rods with a constant section and a constant rod separation along the direction of elongation). Most preferably, the linear trap 150 is curved but with a non-linear sectional area along the axis of elongation, such as is described in our co-pending application no. GB 0626025.1, the contents of which are incorporated herein entirely.

In use, ions generated in the ion source 110 pass through the lens 120, and into the fragmentation cell 130. Here they may be fragmented or not depending upon the ions being analysed and the user's choice. They then pass via second lens 140 into the linear trap 150 where they are captured and cooled. Some crude mass selection may also take place within the linear trap 150. Ion packets are then ejected generally in a direction the curved axis of elongation of the linear trap, as is described in the above referenced GB 0626025.1, and are focussed downstream of the trap 150. They then pass into the second ion mirror arrangement 20 and continue onwards as described above in connection with FIG. 3.

After one, two or three passages through the MR TOF MS, ions may be deflected out of the plane of the drawing such as for example by deflector 41 deflecting ions to detector 50 out of the plane of the paper.

Figure 4:
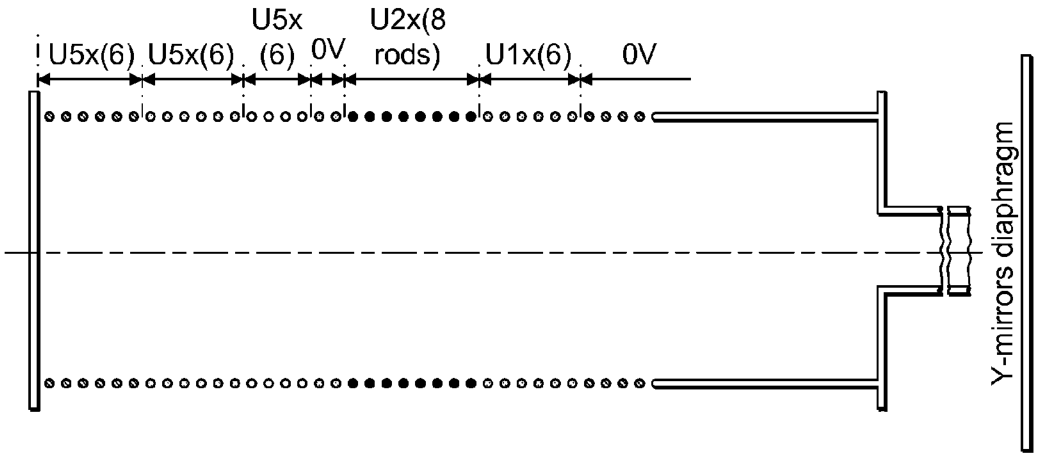
FIG. 4 shows, in section in the XY plane, one possible arrangement of electrodes within a Type 2 ion mirror of FIG. 1, along with some suitable voltages.

One specific embodiment of the Type 2 mirror is shown in XZ section in FIG. 4, and a specific embodiment of the Type 1 mirror also is shown in section in the YZ plane in FIG. 5. FIGS. 4 and 5 show the geometric and electric parameters of the ion mirrors in detail. A series of voltages are supplied from a power supply (not shown) to the electrodes of each, and potentials are applied to a set of precision-ground metallic rods. For example, the rods may be formed of stainless steel, invar or metal-coated glass, for example. Alternatively, a set of thin or thick metal plates, or printed circuit boards could be used to provide the same effect. The specific voltages employed in the preferred embodiment for the second and first ion mirror arrangements 20, 10 are shown in tables in FIGS. 4 and 5 respectively, for ions accelerated by 2 kV.

Figure 10:
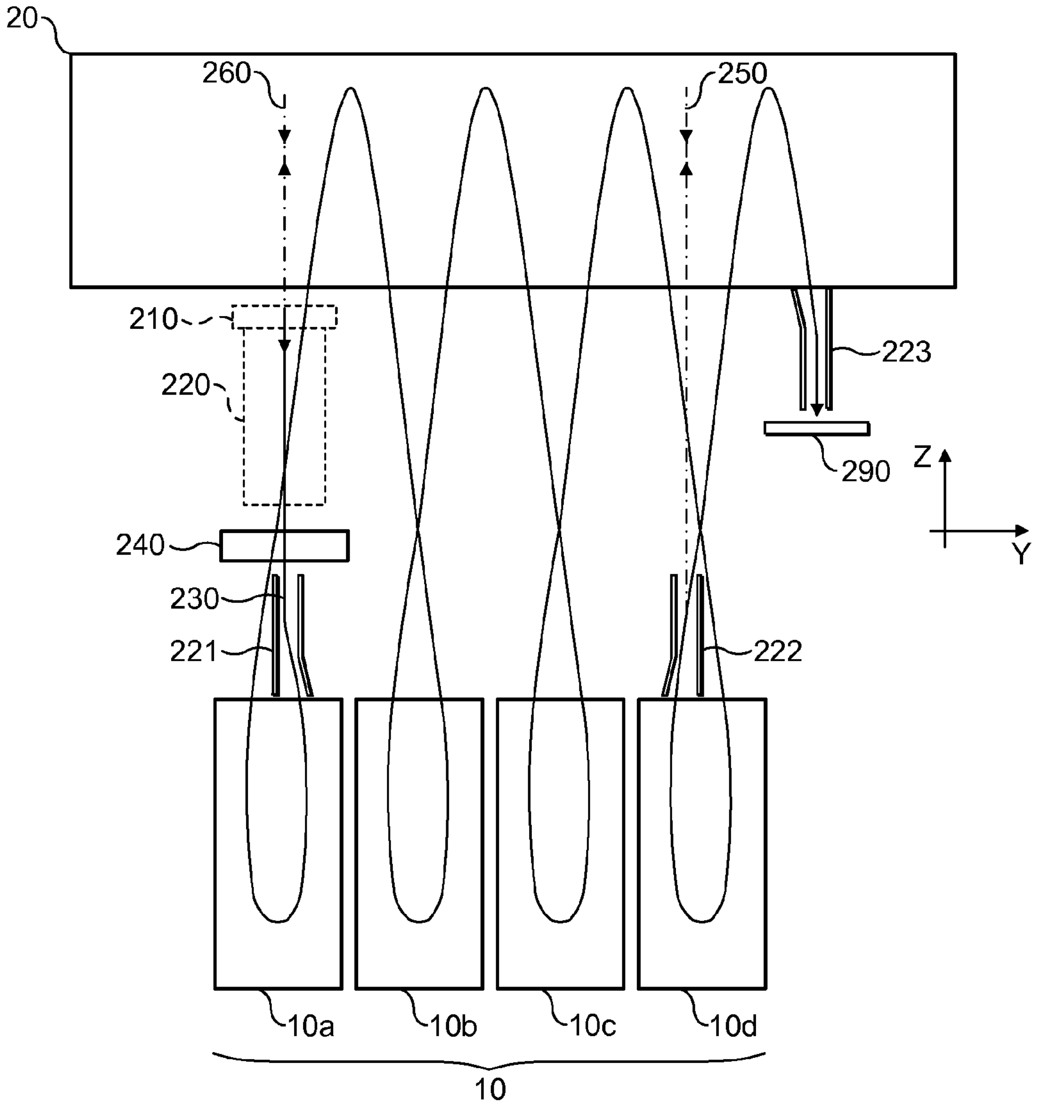
FIG. 10 shows, in section in the XY plane, a further embodiment of the present invention.

FIG. 10 shows another preferred embodiment that allows use of the multi-reflection assembly in 1-pass, 3-pass, and 5- to (2*n−1)-pass mode.

Typically the 1-pass mode will allow quick low resolution mass analysis, 3-pass mode will provide higher resolution analysis over a mass range that approximately matches the mass range of an RF-ion trap operated at a fixed frequency and the higher pass modes providing high resolution “zoom” modes of operation of a smaller mass range.

An injector trap 210 is preferably (but not necessarily) oriented parallel to one of the transversal directions and parallel to the elongation direction of at least one of the mirror sets. Advantageously it can be positioned outside the plane of ion movement, decoupling its properties from the longitudinal motion.

The injector trap 210 may be a curved non-linear RF ion trap such as that disclosed in the applicant's co-pending application published as WO 2008 081334, the contents of which are incorporated herein by reference.

Ions can enter the injector trap directly from an ion source, or through a first mass analyzer and an optional first reaction device which could also be part of the first mass analyzer.

In this configuration a single detector 290 can be used for all single- and multi-pass analyzing modes.

Y deflectors 221, 222, 223 organize entry, reflection and exit of ions in this device as shown in the figure.

Preferably in this configuration the detector element 290 is again parallel to the injector trap 210 and a transversal main direction 230. The detector element 290 can be in the plane of ion movement or out of plane.

While the Type 1 and Type 2 mirrors illustrated in the figures suggest that they are closed on three sides, this is not necessary.

It is preferable to sustain a pressure lower than around $10^{-9} \ldots 10^{-8}$ mbar within this system, preferably using split flow turbomolecular pumps. The preferable overall flight length of an MR TOF MS in accordance with preferred embodiments lies in the range of 10 to 200 meters, with an overall length of the system being between about 0.5 to 1 meter. The average ion acceleration is preferably in the range of 1 to 20 kv, 2 kv being used in the arrangements of FIGS. 4 and 5.

The arrangements thus described provide a large increase in the path length relative to a single reflection time of flight mass spectrometer, but at the same time enhance spatial focussing, improved shielding of ion packets from each other to minimize space charge effects, and provide a simplified ion injection scheme due to the removal of spatial conflict between the ion source and the fringing fields of an ion mirror.

While FIG. 9 does not explicitly show this, it is the case that the focal point lies at the turning point of the ions in the other mirror (the other mirror not being depicted). The mirror action that is depicted is mirror 20—focusing in X.

There are two X-focus points per complete passage. This means that if the entry beam into mirror 20 is parallel, it will focus the beam in X at the turning point of the next mirror 10 (say 10*a*). The beam crosses over in X at its turning point in Z in mirror 10*a*, and comes back out divergent again, mirrors 10 not having any X-focusing action. It enters mirror 20 and is brought parallel by that mirror. It travels parallel into mirror 10*b*, comes out parallel from 10*b* and then enters 20 again. Mirror 20 makes it focus at the turning point in mirror 10*c*. It crosses over, returns divergent to mirror 20 and is again brought parallel by mirror 20.

There are ten Y-focus points per complete passage as shown in FIG. 3. Two lie in each mirror of the set 10, and there are in addition two more at the turning point of mirror 20.

The mirror system depicted schematically in FIG. 10 has second order time of flight focusing at the detector, and if the beam is reversed, at the plane passing through the exit of the injector. That is to say, all energy and spatial aberration coefficients are zero to second order. It has a minimum (but not zero) $3^{rd}$ order time focus coincident with the $2^{nd}$ order time focusing point.

The mirror system produces focal points in X and Y that are not coincident with the time focal points. This has benefits for the detector, as it spreads the ion beam over a larger surface, whist during its extended passage through the instrument it has been contained in X and Y, and not allowed to diverge so as to be too large to detect.

Also the ions are not focused for the majority of their passage, reducing space charge effects, especially as the focus points in X are never the same as those in Y, giving line foci, never point foci.

An odd number of passes through the mirror system is beneficial, because of the action of the Y-deflectors 221, 222, 223 in the embodiment of FIG. 10. Deflecting the beam produces aberrations, but a preferred embodiment utilises a system of deflectors whose aberrations largely cancel when there are an odd number of passes through the mirror system:

When operating in 1-pass mode, the action of Y-deflector 223 cancels that of Y-deflector 221.

When operating in 3, 5, 7 . . . -pass mode, the action of Y-deflector 222 cancels itself out.

When operating in 3, 5, 7 . . . -pass mode the action of Y-deflector 221 cancels itself out except for the first action, which is cancelled by the final action before detection of Y-deflector 223.

In the specific example where a single passage of flight through the mirror system gives about 4 meters of flight, typical resolutions achieved are approximately 20 k for 1 pass, 60 k for 3 passes and 100 k for 5 passes.

This embodiment, as illustrated in FIG. 10, has time focus points at a Z-X plane at the exit of the injector, and at the detector plane. This is because when travelling in a forward direction only after the passage through the fourth ion mirror 10*d* of the first ion mirror arrangement do aberrations of $1^{st}$, $2^{nd}$ and $3^{rd}$ order achieve a minimum. Likewise, when the beam is reversed, only after the passage through mirror 10*a* are the aberrations minimised.

The injector 210 is displaced in X so that it does not interfere with the ion beam path when performing more than one pass of the mirror system, and ions emitted from the injector are deflected into the Z-Y plane by an X-deflector. The detector is shown not displaced but having its centre plane lying in the Z-Y plane in this embodiment. Alternatively it may be out of the Z-Y plane, displaced in X in the same or opposite direction to the displacement of the injector 210 and collimator 220.

In this arrangement, an additional X deflector is required (not shown in FIG. 10). If the detector 290 is displaced out of the plane in this way, any aberrations due to the action of the X deflector 240 may be substantially cancelled by the action of the additional X deflector, if suitably designed.

The cancelling effect of the Y-deflectors 221, 222, 223 means the detector 290 lies perpendicular to the ion beam at best time-focus, and is not tilted. A single detector can be used when odd numbers of passes are performed. For these reasons this arrangement is preferred over that of FIG. 3.

The collimator 220 comprises an entry lens and two "button" lenses (not shown for clarity) contained in a shielding enclosure. The collimator is coupled to the ion injector and is also out of the Z-Y plane. The injector and collimator produce a beam of ions suitable for injection into the mirror system, the beam being tilted with respect to the Z-Y plane, intersecting with it in the vicinity of the X-deflector 240. The X deflector deflects the ion beam into the plane of the mirror system.

To switch from 1-pass mode to multiple pass mode, Y deflector 222 is energised so that it deflects the ion beam along the trajectory 250. Mirror 20 sends the beam back through Y deflector 222 and back through the mirror system. Y deflector 221 is energized so that it deflects the ion beam along trajectory 260. The beam then passes back through the mirror system substantially along the same trajectory as on the first forward pass. This deflection arrangement can be used one or more times to increase the flight path through the mirror system, the beam ultimately reaching detector 290.

The invention claimed is:

1. A method of reflecting ions in a time of flight mass spectrometer, comprising:

providing an ion mirror having a plurality of electrodes, the ion mirror having a cross section with a first, minor axis (Y) and a second, major axis (X) each perpendicular to a longitudinal axis (Z) of the ion mirror which lies generally in the direction of time of flight separation of the ions in the mirror;

guiding ions towards the ion mirror;

applying a voltage to the electrodes so as to create an electric field which:

causes the mean trajectory of the ions to intercept a plane of symmetry of the ion mirror which contains the longitudinal (Z) and major axes (X) of the mirror;

causes the ions to reflect in the ion mirror;

causes the ions to exit the ion mirror; and spatially focuses the ions to at least one first location and temporally focuses the ions to a second location, the second location not being coincident with the at least one first location.

2. The method of claim 1, wherein the electric field spatially focuses the ions in one but not both of the X and Y axes at the at least one first location.

3. The method of claim 1, wherein the electric field causes ions to cross the plane of symmetry at least three times per reflection in the ion mirror.

4. The method of claim 1, wherein the at least one first location is positioned within the ion mirror.

5. The method of claim 1, wherein the step of guiding the ions into the ion mirror comprises guiding the ions into the ion mirror at a non zero angle to the plane of symmetry so that the ions intersect that plane of symmetry for a first time upstream of a plane of reflection of the mean trajectory of the ions; and wherein the applied voltage is arranged to cause the ions to intersect the plane of symmetry for a second time at or adjacent a plane of reflection within the ion mirror, and to eject the ions from the ion mirror again so that they intersect the plane of symmetry for a third time downstream of the plane of reflection.

6. The method of claim 1, wherein the ion mirror forms one of a plurality of (n+1) ion mirrors in a first ion mirror arrangement, the further n ion mirrors in the first ion mirror arrangement each having a plurality of electrodes, wherein each further ion mirror has a cross section with a first, minor axis (Y) and a second, major axis (X), each of which is perpendicular to a longitudinal axis (Z) of the ion mirror which lies generally in the direction of time of flight separation of the ions in each further n ion mirror, wherein the longitudinal axes of each of the further n ion mirrors in the first ion mirror arrangement lie generally parallel with the others and with the longitudinal axis (Z) of the first ion mirror; the method further comprising the steps of:

- causing ions that have exited a first ion mirror of the first ion mirror arrangement to be directed back into a second ion mirror of the first ion mirror arrangement generally in the same direction as the ions had entered the first ion mirror; and
- applying a voltage to the electrodes of the second ion mirror so as to create an electric field which:
  - causes the mean trajectory of the ions to intercept a plane of symmetry of the second ion mirror which contains the longitudinal (Z) and major axes (X) of the mirror;
  - causes the ions to reflect in the second ion mirror; and
  - causes the ions to exit the second ion mirror.

7. The method of claim 6, further comprising:

- causing ions that have exited the second ion mirror of the first ion mirror arrangement to be directed back into the further (n−1) ion mirrors of the first ion mirror arrangement in turn, the ions entering each further (n−1) ion mirror generally in the same direction as the ions had entered the first ion mirror; and
- for each of the further (n−1) ion mirrors, applying a voltage to the electrodes of the further ion mirror so as to create an electric field which:
  - causes the mean trajectory of the ions to intercept a plane of symmetry of the further ion mirror which contains the longitudinal (Z) and major axes (X) of the mirror;
  - causes the ions to reflect in the further ion mirror; and
  - causes the ions to exit the further ion mirror.

8. The method of claim 7 wherein the first ion mirror arrangement comprises four ion mirrors, or an integer multiple of four ion mirrors.

9. The method of claim 7, wherein the step of causing ions to be directed back towards the first ion mirror arrangement comprises reflecting ions in a second ion mirror arrangement having a cross section with a first, minor axis and a second, major axis each generally orthogonal to a longitudinal axis of the second ion mirror arrangement which extends generally in a direction of time of flight separation of ions in that second ion mirror arrangement; wherein a plane of symmetry of the second ion mirror arrangement, which contains the longitudinal and major axes, intersects the plane of symmetry of the first ion mirror arrangement at a non-zero angle.

10. The method of claim 9, wherein the plane of symmetry of the second ion mirror arrangement intersects the plane of symmetry of the first ion mirror arrangement substantially at right angles.

11. The method of claim 7, wherein the step of causing ions to be directed back towards the first ion mirror arrangement comprises reflecting ions in a second ion mirror arrangement having a cross section with a first, minor axis and a second, major axis each generally orthogonal to a longitudinal axis of the second ion mirror arrangement which extends generally in a direction of time of flight separation of ions in that second ion mirror arrangement, wherein each of the ion mirrors of the second ion mirror arrangement comprises a plane of symmetry including the longitudinal and major axes of each said ion mirror, and wherein the plane of symmetry of each ion mirror in the second ion mirror arrangement is generally parallel with the plane of symmetry of each ion mirror in the said first ion mirror arrangement.

12. The method of claim 7, wherein the step of causing the ions to be directed back towards the first ion mirror arrangement comprises reflecting ions in a second ion mirror arrangement comprising a plurality m of ion mirrors, each of the m ion mirrors of the second ion mirror arrangement having a plurality of electrodes, wherein each further ion mirror has a cross section with a first, minor axis and a second major axis each of which is perpendicular to a longitudinal axis of the ion mirror which lies generally in the direction of time of flight separation of the ions in each of the m ion mirrors, wherein the longitudinal axes of each of the m ion mirrors in the second ion mirror arrangement lie generally parallel with each other and with the longitudinal axes of the ion mirrors in the first ion mirror arrangement, and wherein the first and second ion mirror arrangements are opposed to one another so that ions reflect back and forth between the first and second ion mirror arrangements.

13. The method of claim 7, wherein the step of causing the ions to be directed back towards the first ion mirror arrangement comprises reflecting ions in a second ion mirror arrangement, and further comprising a step of providing an ion optical device positioned between the first and second ion mirror arrangement for effecting additional spatial focusing of the ions.

14. The method of claim 6 further comprising reflecting ions that have passed through the first ion mirror arrangement back through the first ion mirror arrangement in a reverse direction.

15. The method of claim 14, further comprising reflecting ions back through the ion mirror in a forward direction for a second time once they have passed through it in the reverse direction.

16. The method of claim 1, further comprising detecting ions following passage through the ion mirror.

17. The method of claim 16, wherein the step of detecting ions comprises detecting ions at a detector which is displaced out of the plane of symmetry of the ion mirror.

18. The method of claim 1, further comprising directing ions that have passed through the ion mirror to a further stage of mass spectrometry.

19. A multireflection time-of-flight mass spectrometer, comprising:

- an ion source for generating ions;
- at least one ion mirror having a plurality of electrodes, the ion mirror having a cross section with a first, minor axis (Y) and a second, major axis (X) each perpendicular to a longitudinal axis (Z) of the ion mirror which lies generally in the direction of time of flight separation of the ions in the mirror;
- a voltage source for applying a voltage to the electrodes so as to create an electric field, the voltage being selected and the plurality of electrodes being arranged to cause the mean trajectory of the ions to intercept a plane of symmetry of the ion mirror which contains the longitudinal (Z) and major axes (X) of the mirror and to cause the ions to reflect in and exit the ion mirror, wherein the mirror spatially focuses the ions to at least one first location and temporally focuses the ions to a second location, the second location not being coincident with the at least one first location; and a detector for detecting ions following passage through the at least one ion mirror.

* * * * *